G. E. WILTON.
MACHINE FOR TRIMMING AND SHAPING THE SIDE EDGES OF BOARDS.
APPLICATION FILED JAN. 28, 1911.
1,015,528.
Patented Jan. 23, 1912.
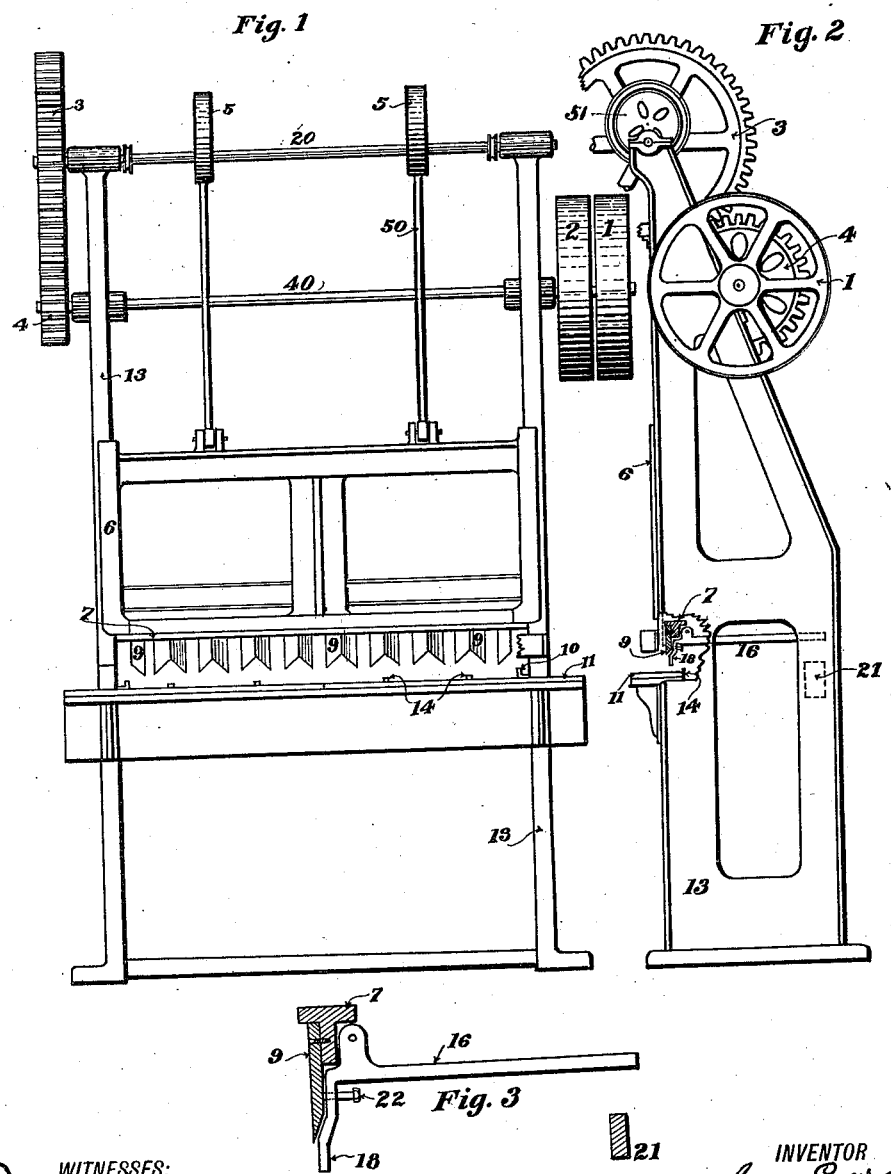

UNITED STATES PATENT OFFICE.

GEORGE E. WILTON, OF EVERETT, WASHINGTON, ASSIGNOR TO WILTON PATENT CEDAR SIDING COMPANY, OF EVERETT, WASHINGTON, A CORPORATION OF WASHINGTON.

MACHINE FOR TRIMMING AND SHAPING THE SIDE EDGES OF BOARDS.

1,015,528.   Specification of Letters Patent.   Patented Jan. 23, 1912.

Application filed January 28, 1911. Serial No. 605,175.

*To all whom it may concern:*

Be it known that I, GEORGE E. WILTON, a citizen of the United States, residing at Everett, in the county of Snohomish, State of Washington, have invented a new and useful Improvement in Machines for Trimming and Shaping the Side Edges of Boards, of which the following is a specification.
My invention relates to devices for trimming and shaping the side edges of boards, and consists of a machine adapted to trim the side edges of the boards in irregular shapes, that is, in other than a straight line. Its special object is to form what is known to the trade as bungalow siding, the same consisting of short pieces of bevel-edged siding or weather-boarding, which have their thick or lower edge shaped to imitate dimension or fancy cut shingles.

The object of my invention is to produce a machine which will shape these short sections of lumber cheaply so as to convert them into a salable product; a machine which will trim the side edges of lumber in irregular or curved outlines without splintering.

My invention comprises the novel parts and combinations of parts which will hereinafter be described and particularly pointed out in the claims.

In the accompanying drawing I have shown my invention in the form which is now preferred by me.

Figure 1 is a front elevation of the machine. Fig. 2 is a side elevation of the machine. Fig. 3 is a view showing cutter bar and knife in cross section and a preferred form of stop in elevation.

In the manufacture of bevel siding or weather boarding, there are large quantities of short pieces which are cut from the weather-boarding in trimming it to standard lengths. These short pieces of irregular lengths are trimmed to lengths forming some multiple of the spacing commonly used for studding. These pieces are then scored across at regular intervals to imitate upon their surface the spaces between shingles. They are then operated upon by the machine forming the subject of my invention to trim the side edge to represent the lower ends of shingles. In use, these are placed horizontally on a building overlapping in the same manner as siding, but the effect pro-
duced is that of applying dimension and fancy trimmed shingles.

The machine as herein shown comprises a frame 13 having vertical guides thereon adapted to receive the ends of a reciprocating frame 6 to which is secured the cutter bar and its knives.

It also comprises a table or plate 11 which is shaped to conform to the outline desired to give the edge of the board and agreeing with the general outline of the knives carried by the cutter bar.

It also comprises means for reciprocating the cutting frame 6 and the knives carried thereby, said means as herein shown consisting of an elevated shaft 20 to which are secured eccentrics 51 upon which are the eccentric straps 5 connected by rods 50 with the frame 6. The shaft 20 is turned through gears 3 and 4, shaft 40, and tight and loose pulleys 2 and 1.

The supporting plate 11 is removable from the machine and has its back edge shaped to correspond to the form to be given the edge of the board. Whenever a new or different form of board is to be made, this plate must be changed.

In the form of blades shown in Fig. 1 the edge of the board is to have angular pieces cut out, to imitate shingles having their corners trimmed off. The knives 9 used for this purpose are flat plates and the edge of the bar or plate 11 has a series of angular notches therein. In making this form of board stops 14 may be secured to the back edge of the plate 11, as the entire edge of the board is not trimmed, and the stop can lie in the angle between the knives 9. In making a different form of board the stops 14 carried by the plate 11 cannot be used. In such cases the stop is carried by the reciprocating cutter bar or frame, in order to prevent splinters and bits of wood wedging between the knife and stop. To accomplish this I have devised the stop shown in Fig. 3. This consists of a bell-crank lever 16 pivoted to the cutter bar rearwardly of the knives and having an arm 18 depending below the knives and acting as a stop. The weight of this lever is sufficient to prevent its being raised when the board is placed against it, while at the same time, when the cutter bar descends, the outer end of the lever contacting with a fixed bar 21 of the frame, will cause the end 18 to be swung away from the knife, thus freeing any splinters which might be forced between this arm 18 and the knife. The exact position of this stop 18 may be adjusted by a screw 22 which serves as an adjustable stop for the bell-crank lever 16, 18. In all cases the knives are so shaped that their cutting edges, when seen in elevation, are at an angle, thus making a shear cut upon the wood. It is in this way only, that a smooth cut may be made. The outline of the supporting plate 11 should conform to the outline of the cutting edges of the knives, so that the board is supported right up to the line of the cut. The shape of the knives may be varied as necessary to give the edge of the board whatever shape is desired. To fix the boards endwise, stops 10 are secured to the supporting plate or the frame.

I claim—

1. In a machine for trimming the side edges of boards, a fixed or bed plate, a series of reciprocating knives and means for moving said knives past the bed plate, said knives and bed plate having closely registering cutting edges conforming in outline with the outline which is to be given the board, stops carried by and depending beneath the reciprocating knives, said stops being pivoted and counterweighted, and a bar engaging said stops to move them away from the knives after each cut.

2. In a machine for trimming the side edges of boards, a bed plate, a series of cutting knives and means for moving said knives past the bed plate, said knives and bed plate having cutting edges conforming in outline to each other and to the shape to be given the edge of the boards, a stop movable with the cutting blades, and means for automatically receding said stop after each cut has been completed.

GEORGE E. WILTON.

Witnesses:
SCHUYLER DURYEE,
E. H. PARKHURST.

---

Copies of this patent may be obtained for five cents each, by addressing the "Commissioner of Patents. Washington, D. C."